United States Patent [19]
Santeler et al.

[11] Patent Number: 5,325,535
[45] Date of Patent: Jun. 28, 1994

[54] LOCK SIGNAL EXTENSION AND INTERRUPTION APPARATUS

[75] Inventors: Paul Santeler; Gary W. Thome, both of Houston, Tex.

[73] Assignee: Compaq Computer Corp., Houston, Tex.

[21] Appl. No.: 719,182

[22] Filed: Jun. 21, 1991

[51] Int. Cl.$^5$ ............................................. G06F 13/00
[52] U.S. Cl. ................................................. 395/725
[58] Field of Search ............... 395/425, 325, 725, 800, 395/275; 364/242.92, 926.91

[56] References Cited

U.S. PATENT DOCUMENTS 5,170,481 12/1992 Begun et al. ........................ 395/725

Primary Examiner—Dale M. Shaw
Assistant Examiner—Sang Hui Kim
Attorney, Agent, or Firm—Pravel, Hewitt, Kimball & Krieger

[57] ABSTRACT

An apparatus which receives locking signals from a first device and provides a lengthened version of certain of these signals to a second device. The apparatus stretches the locking signal provided to ensure that the signal remains valid throughout the entire locked sequence. The apparatus also indicates when arbitration windows are available between back-to-back locked cycles, i.e. when it is okay to relinquish control of the host bus to a requesting bus master or device. The apparatus monitors cache controller activity and notifies arbitration logic when the last write cycle of a read-modify-write sequence or multiple transfer write cycle begins. When the cycle completes, the arbitration logic releases the bus, thus providing an arbitration window for other requesting bus masters and devices. In this manner, overlock conditions which block bus masters from obtaining control of the bus are prevented from occurring.

9 Claims, 5 Drawing Sheets

LOCK SIGNAL EXTENSION AND INTERRUPTION APPARATUS

BACKGROUND OF THE INVENTION

1. Field of the Invention

The present invention relates to control signals in computer systems, and more particularly to an apparatus for modifying a locking signal in a computer system to lengthen the period of the signal and to allow interruption of the lock signal on consecutive locked cycles for arbitration purposes.

2. Description of the Related Art

Computer systems continue to increase in size and complexity. Most modern computer systems include one or more microprocessors in addition to intelligent bus masters and other devices which are capable of taking control of the bus to perform bus cycles. The microprocessor and the various bus masters and devices vie for control of the bus to access necessary code and data and perform useful work. In modern computer systems, it is necessary to ensure that certain cycles being executed by the processor are protected from being split up by another requesting device. An example of cycles that need this type of protection are read-modify-write cycles. In a read-modify-write cycle, the processor reads a memory location to determine its contents and then modifies the location by writing back a new data value. Read-modify-write cycles are commonly used in computer systems to implement memory-based semaphores. In executing read-modify-write cycles, it is important that the bus not be relinquished by the processor between the matching read and write cycles to ensure that the variable being modified is not accessed between the read and the write. With regard to read-modify-write cycles, it is noted that locked cycles may occur as a read-modify-write cycle, a read-read-modify-write-write cycle, a read-read-modify-write cycle, or a read-read cycle. Other cycles which require protection to prevent the processor from relinquishing the bus are any operand transfers which require more than one bus cycle. Examples of such transfers are 64 bit floating read and write cycles, 64 bit descriptor reads, and cache line fills.

In order to provide adequate protection and prevent the processor from relinquishing the bus during a read-modify-write cycle or one of the other cycles requiring protection, locked cycles were developed. Most modern microprocessors include one or more LOCK signal outputs which indicate that the processor is performing a read-modify-write cycle or other cycle requiring protection and that the bus must not be relinquished during this time. For example, the Intel Corporation (Intel) i486 microprocessor includes a bus LOCK output referred to as CPULOCK*. The asserted CPULOCK* signal indicates that the i486 processor is running a read-modify-write cycle. When the CPULOCK* signal is asserted, the current bus cycle is locked, and the i486 microprocessor is allowed exclusive access to the system bus. The i486 processor does not acknowledge a bus hold request when the CPULOCK* signal is asserted. The CPULOCK* signal goes active in the first clock cycle of the first LOCKed bus cycle and goes inactive after the ready signal is returned indicating the completion of the last LOCKed bus cycle. The i486 processor also generates a signal referred to as PLOCK*, which is asserted to guarantee exclusive access to the bus during reads and writes of operands greater than 32 bits.

Background on the Extended Industry Standard Architecture (EISA) is deemed appropriate. EISA is a superset of the Industry Standard Architecture (ISA), a bus architecture introduced in the International Business Machines Corporation (IBM) PC/AT personal computer. EISA based computer systems utilize a standard chip set which includes among others an EISA bus controller (EBC). The EBC interfaces between the memory or host bus and the expansion bus or EISA bus and includes clock generation logic, bus interface logic, DMA interface logic, bus master interface logic, and buffer control logic, among others. Preferably the EBC is the 82358 from Intel, or its equivalent.

Most modern computer systems also generally include cache memory systems. Cache memory is a small amount of very fast, and expensive, zero wait state memory used to store frequently accessed code and data. One example of a cache controller used in cache memory systems is the C5 or 82495 cache controller produced by Intel Corporation (Intel). The C5 cache controller is designed to operate with the i486 processor. The C5 cache controller receives the locking signals produced by the microprocessor, for example, the CPULOCK* and the PLOCK* signals from the i486 processor, and generates two similar signals referred to as KLOCK* and CPLOCK* respectively. The CPLOCK* signal tracks the PLOCK* signal generated by the i486 processor and is only generated for write cycles. When consecutive write cycles are PLOCKed together, snooping is disabled between these cycles. The CPLOCK* signal is only generated during write cycles because the C5 cache controller operates all read cycles as uninterruptible burst transfers, and thus locking is unnecessary for read cycles. The CPLOCK* signal is active for the first write of a CPLOCKed operation and goes away with the assertion of the next address or ready signal of that write. The CPLOCK* signal is not asserted for the second write operation. The KLOCK* signal is asserted by the C5 cache controller to the memory controller to indicate a request to execute read-modify-write cycles. The KLOCK* signal is a one-clock flow-through version of the CPULOCK* signal. The C5 cache controller activates the KLOCK* signal with the cache address strobe signal CADS* on the first cycle of a LOCKed operation, and the KLOCK* signal remains active until the CADS* signal is asserted on the last cycle of the LOCKed operation, i.e., the final write of a read-modify-write sequence. Thus the KLOCK* and CPLOCK* signals output from the C5 cache controller are not valid during the entire last LOCKed cycle. However, the EISA bus controller (EBC) requires that the LOCK* signal it receives at its input be valid throughout the entire LOCKed cycle. Therefore, problems arise when the C5 cache controller is incorporated into an EISA based computer system utilizing the EBC.

Another problem that arises with the C5 cache controller locking signals generated by the C5 cache controller is that, when pipelining is implemented by the microprocessor, it is possible for the KLOCK* signal on the host bus to remain active from one locked cycle to the next, thus preventing other bus masters or devices from arbitrating for control of the bus during this time. During back-to-back LOCKed cycles, the KLOCK* signal output from the C5 cache controller will generally remain asserted, thus blocking other devices from obtaining the bus. Therefore, when pipelining is implemented, situations arise wherein the deactivation of the KLOCK* signal occurs on the same clock edge as its new activation, and in this instance the KLOCK* signal does not go inactive between back-to-back LOCKed sequences. One method that could be used to allow arbitration windows between back-to-back LOCKed cycles is to detect a LOCKed write followed by a LOCKed read. A LOCKed read following a LOCKed write signifies that the prior LOCKed write was the last write of a read-modify-write cycle and that the LOCKed read is the first read of a subsequent read-modify-write cycle. However, a problem with this method occurs because detecting a LOCKed write followed by a LOCKed read does not provide a sufficient amount of time in order to halt the execution of the LOCKed read and allow arbitration for the bus. If the method of detecting a LOCKed read following a LOCKed write is used, the read cycle may already begin before there is time to halt the cycle and allow arbitration. Therefore a method and apparatus which allows arbitration between back-to-back LOCKed sequences is desired.

SUMMARY OF THE INVENTION

The present invention comprises an apparatus which receives the locking signals from the C5 cache controller and provides lengthened versions of these signals to the EBC. The apparatus stretches certain of the locking signals provided to the EBC to ensure that these signals remain valid throughout the entire LOCKed sequence. In addition, the apparatus operates properly with pipelined cycles where the CADS* strobe is asserted to begin a new cycle prior to the completion of the previous cycle.

The present invention also includes an apparatus which indicates when arbitration windows are available between back-to-back LOCKed cycles, i.e. when it is okay to relinquish control of the host bus to a requesting bus master or device. The apparatus monitors cache controller activity and searches for the initiation of the last cycle of either a read-modify-write cycle or a read-read-modify-write-write cycle by monitoring the cache write/read signal CWR* during the assertion of the CADS* strobe. The apparatus anticipates the last write of a read-modify-write or read-read-modify-write-write cycle and notifies arbitration logic when the write cycle begins. When the cycle completes, the arbitration logic releases the bus, thus providing an arbitration window for other requesting bus masters and devices. The apparatus also notifies the arbitration logic when the locking signal is deasserted during a read-read-modify-write cycle or a read-read cycle completes so that the arbitration logic can provide an arbitration window for other requesting devices. In this manner a sequence of lock conditions which block bus masters and other devices from obtaining control of the bus are prevented from occurring.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
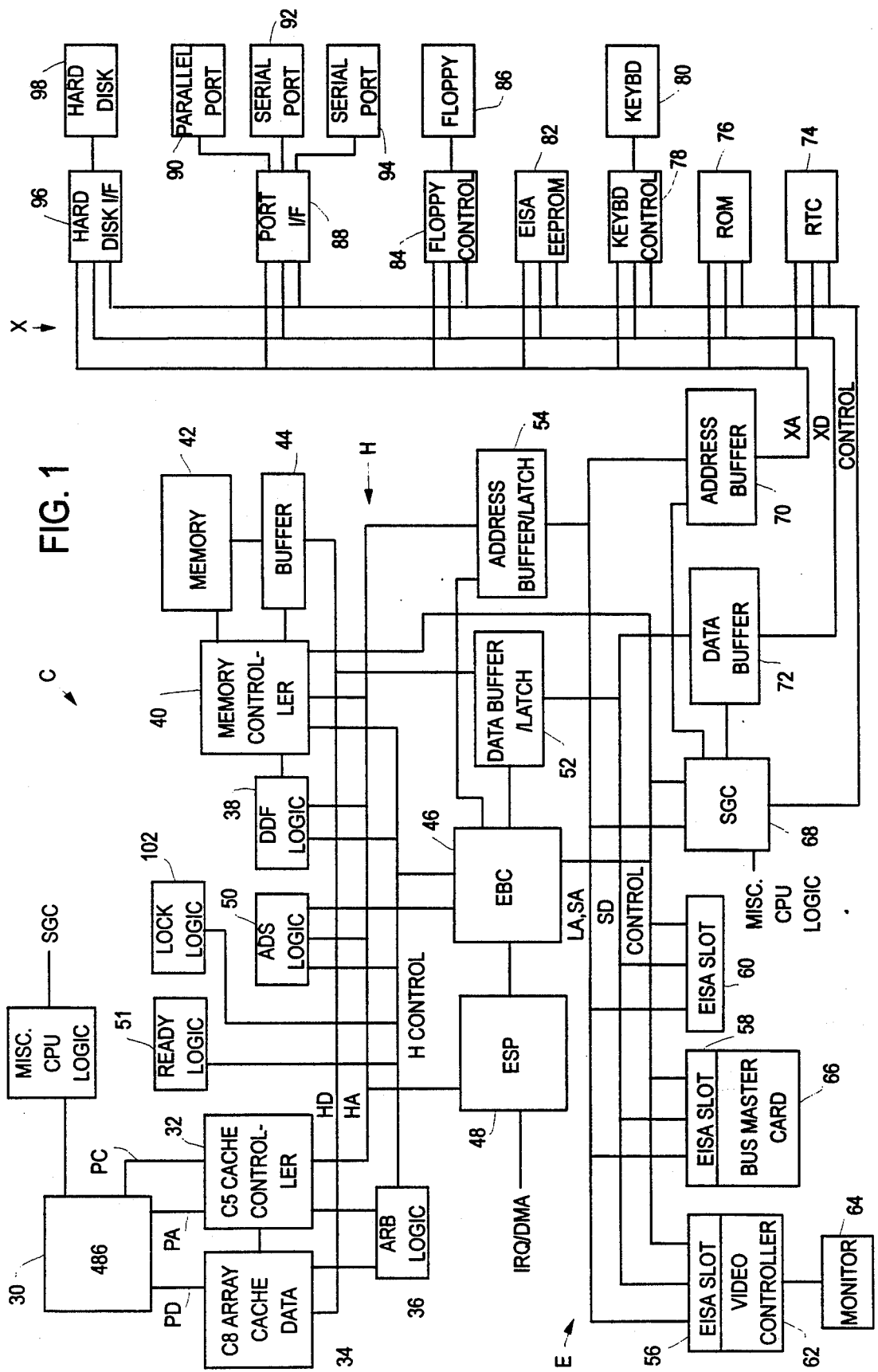
FIG. 1 is a block diagram of a computer system according to the present invention.

Referring now to FIG. 1, a computer system generally referred to by the letter C incorporating the present invention is shown. The foundation of a computer system C according to the present invention is a microprocessor 30, preferably the ii486 from Intel Corporation (Intel). Connected to the microprocessor 30 is a cache subsystem comprising a cache controller 32, preferably the C5 or 82495 cache controller by Intel, and an array of cache data RAM's 34, preferably the C8 or 82490 data RAM's also from Intel. The microprocessor 30, the cache controller 32 and the cache data RAM's 34 are connected as indicated and specified by Intel. To this end the processor data bus PD is connected to the data RAM's 34 and the processor address bus PA and the processor control bus signals PC are connected to the cache controller 32. The cache controller 32 and the cache data RAM's 34 are also connected by various control signals. Preferably the components are the 50 MHz versions.

The cache controller 32 and the cache data RAM's 34 are coupled to a bus generally referred to as the host bus H which includes a host data bus HD portion, a host address bus HA portion and a host control bus HCONTROL portion. Arbitration logic 36 produces some control signals in the HCONTROL bus from signals provided by the cache controller 32 and the cache data RAM's 34. The HCONTROL bus includes signals such as the memory read or write signal, the memory or input/output signal, various address and data strobes and so on as commonly utilized by the various other elements in the computer system C.

Connected to the host bus H is a memory subsystem including data destination facility (DDF) logic 38, a memory controller 40, memory 42 and a memory data buffer 44. The DDF logic 38 provides address translation and memory module activation and is more completely described in U.S. patent application Ser. No. 431,666 filed Nov. 3, 1989 and in its European Patent Office counterpart having an application number of 90 311 749.7 and a filing date of Oct. 26, 1990, which was published on May 8, 1991, both of which are hereby incorporated by reference. The memory controller 40 provides the various control functions necessary to allow the various units operating on or over the host bus H to interact with the actual memory devices 42. The memory 42 is comprised of a series of page mode dynamic random access memories (DRAM's) arranged in an interleaved format. The memory controller 40 includes the necessary functions to control the operation of the DRAM's and of the data buffer 44. Ready logic 51 which generates ready signals to the various elements in the computer system C is coupled to the HCONTROL bus.

In the preferred embodiment, the computer system C utilizes the EISA or Extended Industry Standard Architecture for the external bus. The EISA bus is generally referred to by the letter E in the Figure. The EISA bus E is comprised of several portions, the LA and SA address buses, the SD data bus and the control bus. A bus controller 46 referred to as the EBC, provides certain of the necessary control functions between the host bus H and the EISA bus E. LOCK logic 102 according to the present invention which provides stretched versions of locking signals generated by the cache controller 32 to the EBC 46 and allows arbitration intervals between back-to-back LOCKed sequences is shown coupled through the HCONTROL bus to the EBC 46 and various other elements in the system C.

Connected to the EBC 46 is the EISA system peripheral (ESP) 48, which includes various timers, the direct memory access (DMA) controller and the interrupt controller logic of the computer system C. Also connected to the EBC 46 is ADS or address strobe logic 50. The ADS logic 50 is used to convert certain differences in the various strobes from the cache controller 32 to those necessary for use by the EBC 46. The EBC 46 controls a data buffer/latch 52 connected between the host data bus HD and the external data bus SD and an address buffer/latch 54 connected between the host address bus HA and the external address buses LA and SA in the EISA bus E. Connected to the EISA bus E are a series of EISA slots 56, 58 and 60 according to the EISA convention. In the preferred embodiment, the EISA slot 56 is preferably a special slot having a pin adapted for special operations with a video controller 62. A monitor 64 is connected to the video controller 62. Additionally in the disclosed embodiment, one of the general purpose EISA slots 58 includes a bus mastering card 66 which operates according to the EISA specification. The bus mastering card allows high performance data transfers over the EISA bus E. As an example, the bus master card 66 may be a high performance disk controller which transfers information from the attached hard disk devices directly into the memory 42. It is noted that the bus master card 66 could be either an EISA bus master or an ISA bus master. The remaining EISA slots are generally referred to by the number 60 and in a typical design would include up to 6 slots for insertion of either other EISA cards or conventional ISA cards as readily available.

A fourth general bus referred to as the X bus is also present in the computer system C. The X bus is developed from the EISA bus E by means of a system glue chip (SGC) 68, which performs numerous address decoding operations; an address buffer 70; and a data buffer 72. The SGC 68 controls the operation of the data buffer 72 and the address buffer 70, as well as providing various strobes over an X control bus to the miscellaneous devices contained on the X bus. The first item contained on the X bus is a real time clock (RTC) 74, which contains the necessary CMOS memory and clock functions utilized in the computer system C. A read only memory (ROM) 76 includes the necessary basic operating software utilized in the computer system C and communicates over the X bus. A keyboard controller 78 is connected to the X bus and has connected to it a keyboard 80 to allow data entry. Optionally the keyboard controller 78 can include a second interface for a pointing device (not shown). An electrically erasable programmable read only memory (EEPROM) 82 is connected to the X bus to retain the extended set up information required for an EISA system relating to board configuration. A floppy controller 84 is connected to the X bus and has connected to it a floppy disk drive 86. A port interface circuit 88 is connected to the X bus and provides a parallel port 90 and two serial ports 92 and 94. Further, a hard disk interface 96 is connected to the X bus, with a hard disk 98 being connected to the interface 96. This list of peripheral devices is exemplary and numerous other peripheral devices could be developed either on the X bus or on the EISA bus E.

Figure 2:
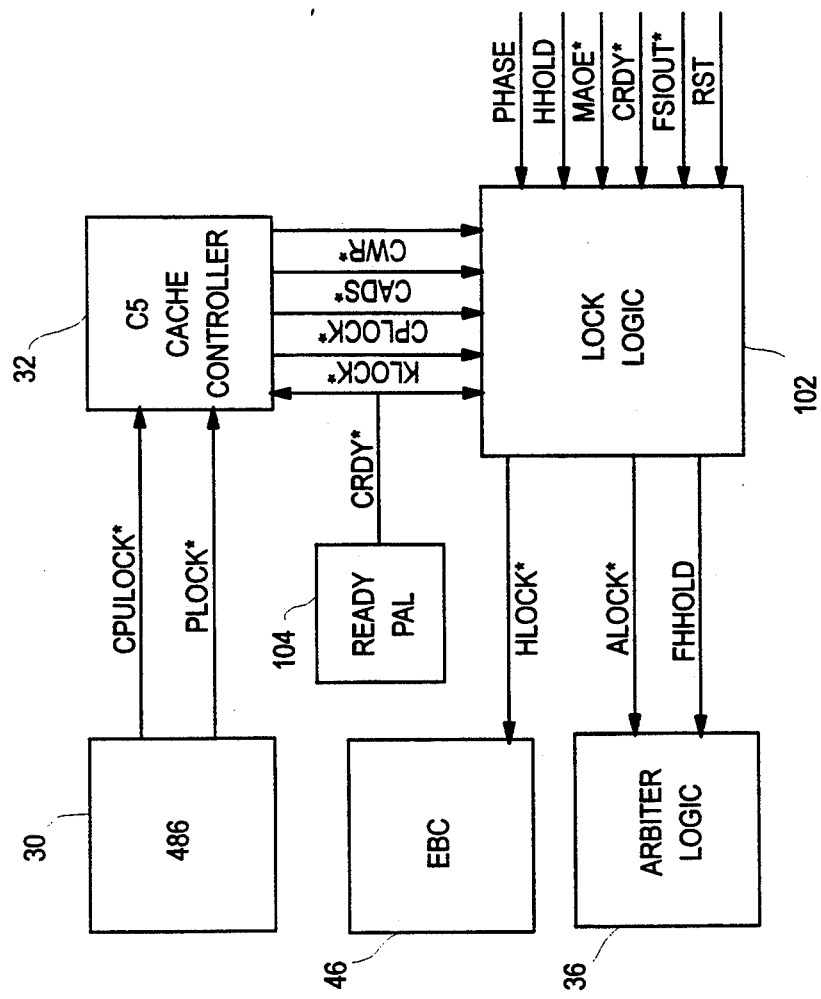
FIG. 2 is a more detailed blocked diagram of a portion of the computer system of FIG. 1.

Referring now to FIG. 2, a block diagram illustrating the LOCK logic 102 interfaced to the arbiter logic 36, EBC 46, i486 processor 30, the ready logic 104, and the C5 cache controller 32 is shown. The i486 processor 30 generates a locking signal referred to as CPULOCK* to the C5 cache controller 32. The CPULOCK* signal requests uninterrupted or locked cycles for read-modify-write cycles and reads and writes of memory operands greater than 32 bits as was discussed in the background. The i486 processor 30 also provides the PLOCK* signal to the C5 cache controller 32. The C5 cache controller 32 generates signals referred to as KLOCK*, CPLOCK*, CADS* and CWR* to LOCK logic 102. The KLOCK* signal indicates to the computer system and to the LOCK logic 102 that the processor 30 has made a request to execute a read-modify-write cycle. The KLOCK* signal essentially follows the CPULOCK* signal. The CPLOCK* signal is developed from the PLOCK* signal generated by the i486 processor 30 and informs the computer system and the LOCK logic 102 of write requests which require protection, such as 64 bit write cycles. The C5 cache controller 32 does not assert this signal during read cycles which need protection because all read operations are performed by the C5 cache controller 32 using a burst protocol, and thus locking protection is not necessary for read cycles. The CADS* signal is an address strobe signal generated by the C5 cache controller 32. The CWR* signal is provided by the C5 cache controller 32 at a high level to indicate a write operation and at a low level to indicate a read operation. The C5 cache controller 32 activates the KLOCK* signal with the CADS* signal on the first cycle of a LOCKed operation when the CPULOCK* signal is asserted. The LOCK logic 102 generates a signal referred to as HLOCK* to the EBC 46. The HLOCK* signal is a non-pipelined version of the KLOCK* and CPLOCK* signals provided to the LOCK* input of the EBC 46 according to the present invention. The LOCK logic 102 also generates a signal referred to an ALOCK* to the arbiter logic 36. The ALOCK* signal is deasserted by the LOCK logic 102 to indicate that control of the host bus H can be relinquished to an ISA/EISA bus master. The arbiter logic 36 retains control of the host bus as long as the ALOCK* signal is asserted.

Figure 3:
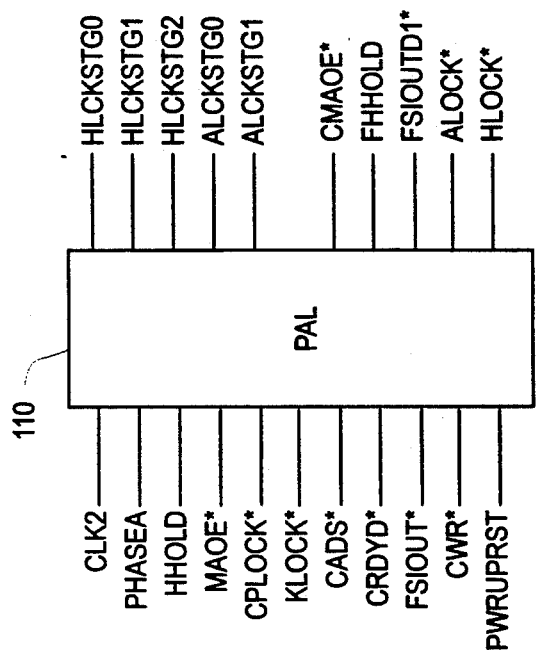
FIG. 3 illustrates a programmable array logic (PAL) device comprising the LOCK logic of FIG. 2.

Referring now to FIG. 3, a programmable array logic (PAL) device which implements the LOCK logic 102 is shown. The PAL 110 receives input signals CPLOCK*, KLOCK*, CADS*, CWR*, and also receives signals referred to as PHASE, HHOLD, MAOE*, CRDY*, FSIOUT* and RST. The PHASE signal is a signal created to predict the state of a clocking signal referred to as CLK1*. The PAL 110 receives the CLK2 signal, preferably the 50 MHz system clock, for clocking operations. In the preferred embodiment the main clock is a 50 MHz signal, while the EBC 46 internally utilizes a 25 MHz clock which is developed from the 50 MHz clock signal. The PHASE signal is provided so that operations can be synchronized to the 25 MHz clock signal. The HHOLD signal is a host hold request signal generated by the EBC 46 to request control of the host bus H. The MAOE* signal is a memory address output enable signal which, when asserted low, enables the cache controller 32 to drive the host address or HA bus. The MAOE* signal can be considered to be equivalent to a HOLDA or hold acknowledge signal. The FSIOUT* signal is a control signal generated by the cache controller 32 which indicates, when asserted low, that a flush is occurring in the C5 cache controller 32. The RST signal is asserted high when a reset condition is occurring. The PAL 110 generates signals referred to as HLCKSTG0, HLCKSTG1, and HLCKSTG2 which represent a state machine generated inside the PAL 110 which controls the generation of the HLOCK* signal. The PAL 110 also generates signals referred to as ALCKSTG0 and ALCKSTG1 which represent a state machine generated inside the PAL 110 which controls the generation of the ALOCK* signal. A signal referred to as FHHOLD is a latched version of the HHOLD signal synchronized with the PHASE signal and provided to the arbiter logic 36. The equation for the FHHOLD signal is:

FHHOLD:=PHASE*·HHOLD+FHHOLD· HHOLD

A signal referred to as FSIOUTD1* is a one CLK2 signal cycle delayed version of the FSIOUT* signal. The equation for the FSIOUTD1 signal is:

FSIOUTD1:=FSIOUT

A signal referred to as CMAOE* is a version of the memory address output enable signal provided to the input of the cache controller 32 which, when asserted low, directs the cache controller 32 to drive the host address bus. The equation for the CMAOE* signal is:

CMAOE=MAOE+FHHOLD*

The equations for the HLCKSTG0, HLCKSTG1, and HLCKSTG2 signals are as follows:

```
HLCKSTG0 := HLCKSTG1* · MAOE* · CADS · RST*
    + HHLCKSTG0* · HLCKSTG1* · CADS · RST*
    + HLCKSTG1* · CRDY · CADS · RST*
    + HLCKSTG1* · CPLOCK · CADS · RST*
    + CPLOCK · CRDY · CADS · RST*
    + HLCKSTG1* · KLOCK · CADS · RST*
    + KLOCK · CRDY · CADS · RST*
    + HLCKSTG1 · CRDY · CADS* · RST*
    + HLCKSTG0 · CRDY* · CADS* · RST*
    + HLCKSTG0 · HLCKSTG1 · CRDY* · RST*
HLCKSTG1 := HLCKSTG1 · CRDY* · RST*
    + HLCKSTG1 · CADS · RST*
    + HLCKSTG0 · MAOE · CRDY* · CADS · RST*
HLCKSTG2 := HLCKSTG0* · HLCKSTG1* · CPLOCK ·
         CADS · RST*
    + HLCKSTG0* · HLCKSTG1* · KLOCK · CADS ·
         RST*
    + HLCKSTG1* · MAOE · CPLOCK · CRDY · CADS ·
         RST*
    + HLCKSTG1* · MAOE · KLOCK · CRDY · CADS ·
         RST*
    + HLCKSTG1* · HLCKSTG2 · CPLOCK · RST*
    + HLCKSTG1* · HLCKSTG2 · KLOCK · RST*
    + HLCKSTG1 · HLCKSTG2 · CRDY* · RST*
    + HLCKSTG0 · HLCKSTG2 · CRDY* · RST*
    + HLCKSTG0 · HLCKSTG2 · MAOE* · CADS ·
         RST*
    + HLCKSTG0 · HLCKSTG1 · CRDY · RST*
```

The equation for the HLOCK signal is as follows:

HLOCK:=RST*·HLCKSTG2·MAOE

Figure 4:
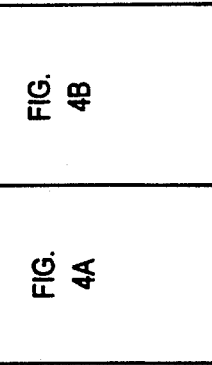
FIG. 4 illustrates the relationship of FIGS. 4A and 4B.

Referring now to FIG. 4, a state transition diagram illustrating the HLOCK state machine is shown. Each of the states in the state machine includes a value which corresponds to the values of the HLCKSTG2, HLCKSTG1, and HLCKSTG0 signals. The state machine transitions on the rising edge of the CLK2 signal, and all states lead to state H0, the idle state, when the RST signal is asserted. The state machine begins in state H0, which is an idle state where no LOCKed cycles are being performed. The state remains in state H0 while the condition:

CADS*+RST is true. The state machine transitions from state H0 to state H1 when the condition:

CADS·MAOE·CPLOCK*·KLOCK* is true, when an unLOCKed cycle controlled by the C5 cache controller 32 is commencing.

In state H1 the cache controller 32 is beginning a non-pipelined and unLOCKed bus cycle. The state machine remains in state H1 while the condition:

(CADS·MAOE·CRDY·CPLOCK*·KLOCK*)·+- (CADS*·CRDY*)+(CADS·MAOE*)

is true. The state machine remains in state H1 while non-pipelined, unLOCKed bus cycles are being performed. The state machine returns from state H1 to state H0 when the condition:

(CRDY·CADS*)+RST is true. The state machine returns from state H1 to state H0 when the non-pipelined, unLOCKed bus cycle completes and a new cycle has not yet been initiated.

The state machine advances from state H1 to state H5 when the current cycle completes and the upcoming cycle is a LOCKed cycle, as signified by the condition:

CADS·MAOE·CRDY·(CPLOCK+KLOCK)

In state H5, the HLOCK* signal is asserted low because the current cycle being executed is a LOCKed cycle. The status of the HLOCK* signal is indicated in the state machine illustration as being asserted in states with concentric circles, such as H5, and negated on states with single circles, such as H1.

The state machine advances from state H1 to state H2 when the C5 cache controller 32 begins a pipelined cycle and the upcoming cycle is an unLOCKed cycle, signified by the condition:

CADS·MAOE·CRDY*·CPLOCK*·KLOCK*

Thus when the cache controller 32 begins a new cycle, signified by the CADS* signal being asserted, before the CRDY signal is returned to complete the previous cycle, then pipelining is being instituted by the cache controller 32. Also, since the CPLOCK* and KLOCK* signals are both negated high, the new pipelined cycle is an unLOCKed cycle.

The state machine advances from state H1 to state H3 when the cache controller 32 initiates pipelining and the next cycle will be a LOCKed cycle, signified by the condition:

CADS·MAOE·CRDY*·(CPLOCK+KLOCK)

In this instance, the current cycle has not yet completed, signified by the CRDY signal being negated. However either of the CPLOCK* or KLOCK* signals has been asserted, indicating that the next bus cycle which is a pipelined cycle, will be a LOCKed cycle. Note here that the HLOCK* signal is not asserted in this state since the upcoming cycle, not the current cycle, will be a LOCKed cycle.

In state H2, the cache controller 32 has initiated a pipelined cycle and the cycle will be an unLOCKed cycle because the CPLOCK* and KLOCK* signals were both negated on the transition from state H1 to state H2. The state machine remains in state H2 while the cache controller 32 performs unLOCKed pipelined cycles, signified by the condition:

(CADS·CRDY·CPLOCK*·KLOCK*)+CRDY*

The state machine returns from state H2 to state H1 when the cache controller 32 discontinues pipelining, signified by the condition:

CRDY·CADS*

The state machine advances from state H2 to state H3 when the cache controller 32 indicates that the next cycle will be a pipelined, LOCKed cycle, signified by the condition:

CADS·CRDY·(CPLOCK+KLOCK).

Figure 4A:
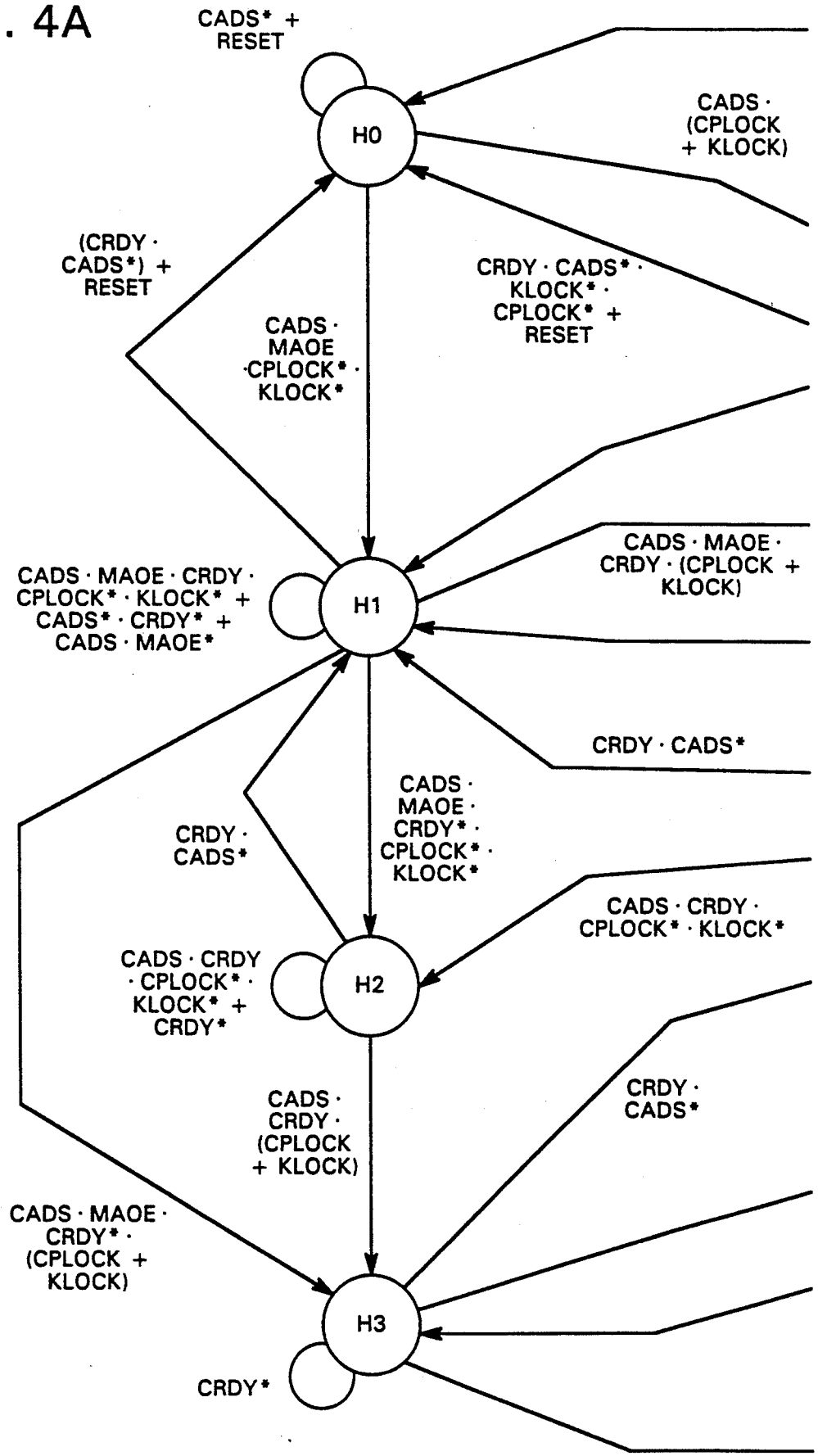
FIGS. 4A, 4B and 5 illustrate state transition diagrams generated by the PAL of FIG. 3.
Figure 4B:
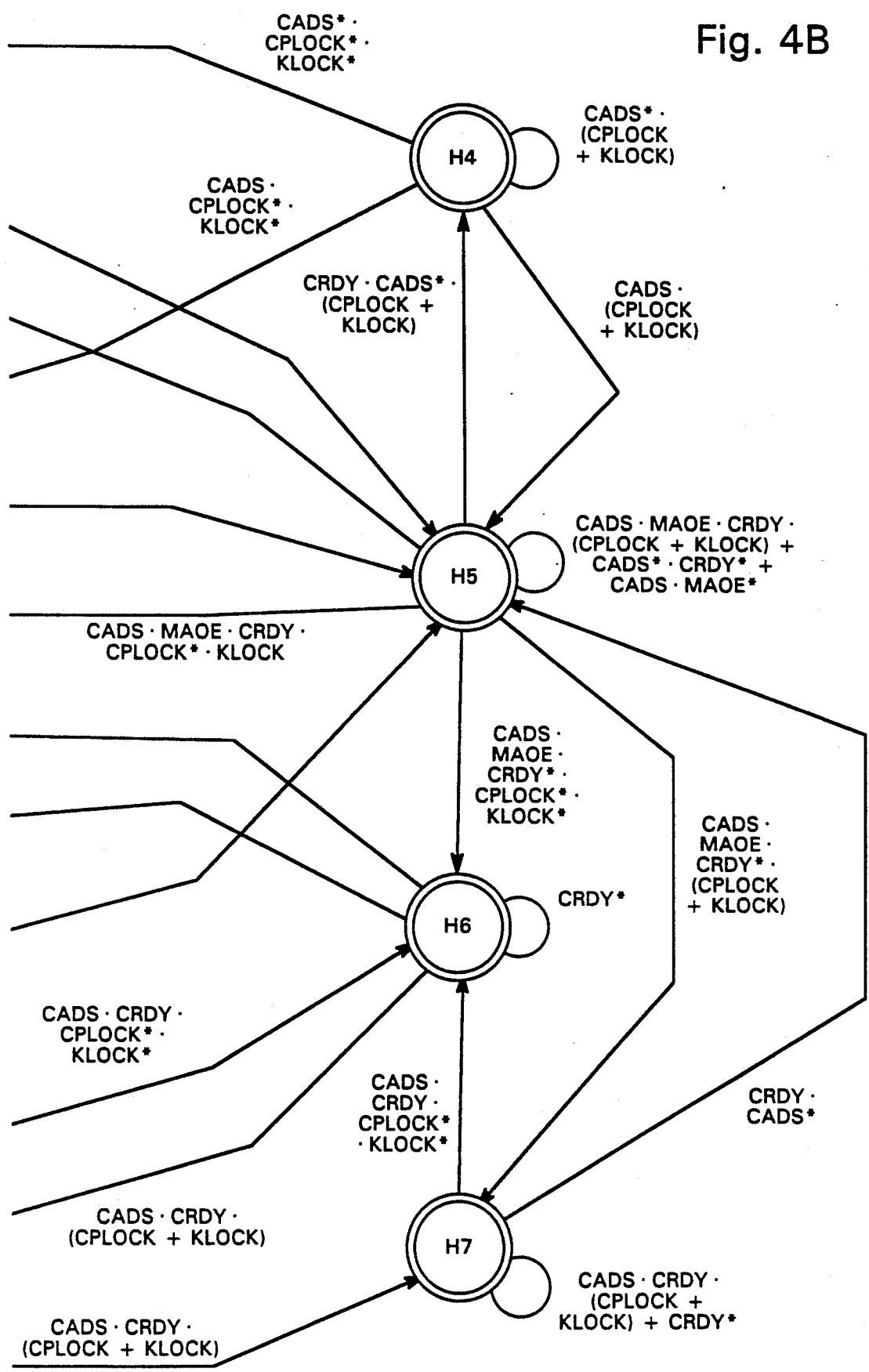
Figure 5:
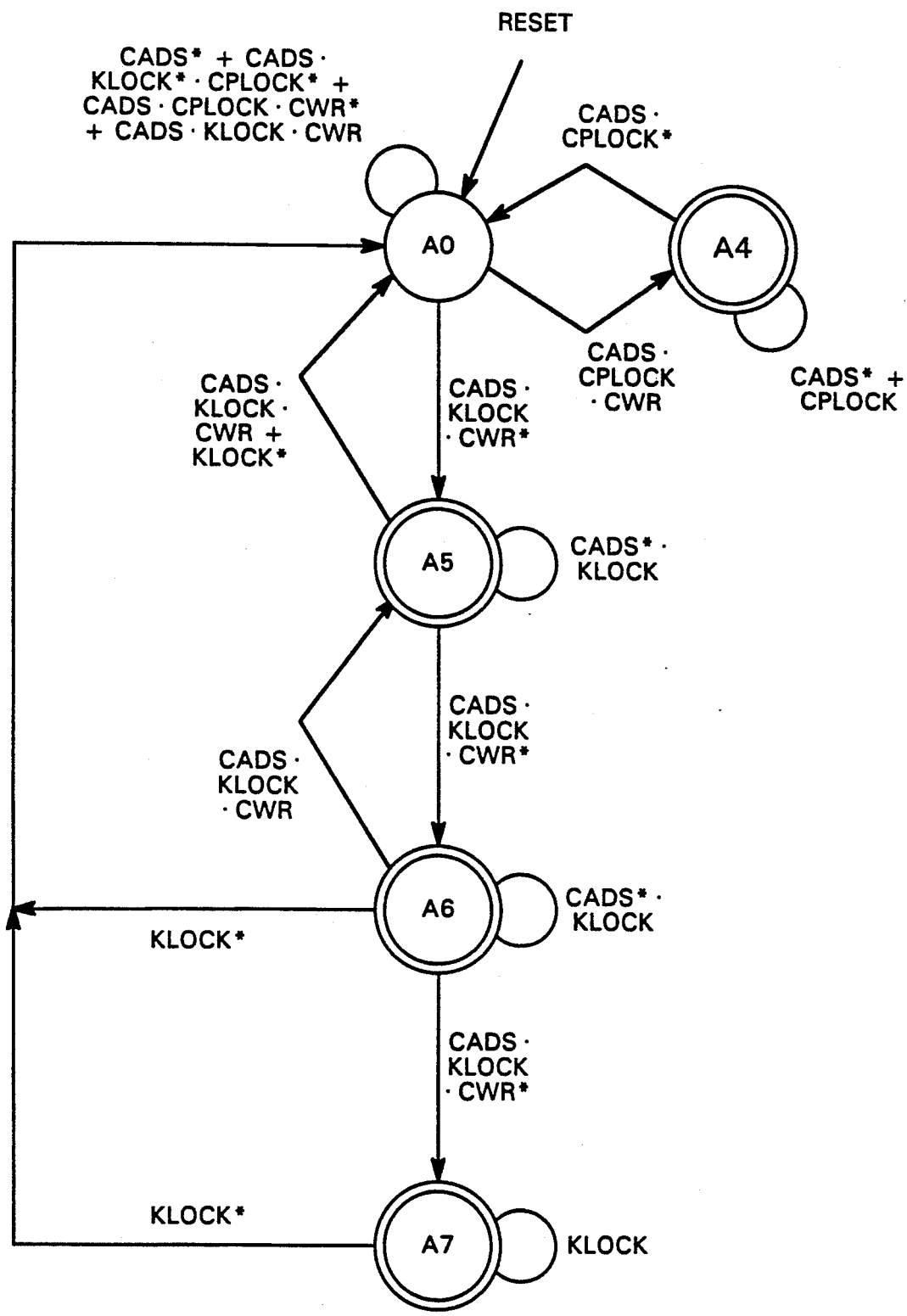

In state H3 the cache controller 32 is performing pipelined, unLOCKed cycles, and it has been indicated that the upcoming cycle will be a LOCKed cycle. The state machine remains in state H3 while the CRDY signal is negated. When the current unLOCKed cycle completes, the state machine advances from state H3 to state H6 (FIG. 4B) to run a single LOCKed cycle if the cache controller 32 has indicated that the cycle following the one that has already been pipelined will be an unLOCKed cycle, signified by the condition:

CADS·CRDY·CPLOCK*·KLOCK*

In state H6, the HLOCK* signal is asserted low because a LOCKed cycle is being performed.

The state machine advances from state H3 to state H7 when the unLOCKed cycle terminates and the cache controller 32 indicates that the succeeding pipelined cycle following the one that has already been pipelined will also be a LOCKed cycle, signified by the condition:

CADS·CRDY·(CPLOCK+KLOCK)

In state H7 the HLOCK* signal is asserted low.

The state machine advances from state H3 to state H5 when the cycle completes and a new cycle following the cycle being started has not yet been initiated by the cache controller 32, signifying that the cache controller 32 is no longer pipelining. This transition is signified by condition:

CRDY·CADS*

In state H5, the HLOCK* signal is asserted.

The state machine transitions from its idle state H0, to state H5 when the cache controller 32 begins a non-pipelined LOCKed cycle signified by the condition:

CADS·(CPLOCK+KLOCK).

As noted above, in state H5, the HLOCK* signal is asserted low. The state machine remains in state H5 while the cache controller 32 continues to perform non-pipelined LOCKed cycles, signified by the condition:

(CADS·MAOE·CRDY·(CPLOCK+KLOCK))+·
(CADS*·CRDY*)+(CADS·MAOE*)

The state machine advances from state H5 to another idle state, state H4, when the current cycle completes, no new cycle has been initiated, and the cache controller 32 has asserted either of the KLOCK* or CPLOCK* signals, indicating that the next cycle will be a LOCKed cycle. This transition is signified by the condition:

CRDY·CADS*·(KLOCK+CPLOCK)

In state H4 the HLOCK* signal is asserted low. The state machine remains in state H4 while a cycle has not been started but it is still indicated that the next cycle will be LOCKed, as signified by the condition:

CADS*·(KLOCK+CPLOCK)

The state machine transitions from state H4 to state H0 if the cache controller 32 negates the respective locking signal that was asserted in state H4 before a new cycle is initiated, signified by the condition:

CADS*·CPLOCK*·KLOCK*

The state machine transistions from state H4 to state H1 if the cache controller 32 begins a non-pipelined, unLOCKed cycle, signified by the condition:

CADS·CPLOCK*·KLOCK*

The state machine returns from state H4 to state H5 when a non-pipelined LOCKed cycle is begun by the cache controller 32, signified by the condition:

CADS·(CPLOCK+KLOCK)

The state machine returns from state H5 to state H0 when the current cycle completes, no new cycle has been initiated by the cache controller 32, and the KLOCK* and CPLOCK* signals are both negated or reset is occurring. This transition is signified by the condition:

CRDY·CADS*·KLOCK*·CPLOCK*+RST

The state machine transitions from state H5 to state H1 when the cache controller 32 begins a non-pipelined unLOCKed cycle, signified by the condition:

CADS·MAOE·CRDY·CPLOCK*·KLOCK*

The state machine transitions from state H5 to state H7 when the cache controller 32 begins a pipelined LOCKed cycle, i.e. begins a LOCKed cycle before the current LOCKed cycle in state H5 has completed, signified by the condition:

CADS·MAOE·CRDY*·(CPLOCK+KLOCK)

The state machine remains in state H7 while the cache controller 32 is executing LOCKed, pipelined cycles, signified by the condition:

CADS·CRDY·(CPLOCK+KLOCK)+CRDY*

The state machine advances from state H7 to state H5 when the cache controller 32 discontinues pipelining, signified by the condition:

CRDY·CADS*

The state machine advances from state H7 to state H6 when the cache controller 32 indicates that the next pipelined cycle will be an unLOCKed cycle, signified by the condition:

CADS·CRDY·CPLOCK*·KLOCK*

The state machine transitions from state H5 to state H6 when the cache controller 32 begins pipelining and the new pipelined cycle is an unLOCKed cycle. This transition is signified by the condition:

CADS·MAOE·CRDY*·CPLOCK*·KLOCK*

The state machine remains in state H6 until the previous cycle completes, that is, while the CRDY signal is low or the CRDY* term is true. The state machine transitions from state H6 to state H1 to execute the unLOCKed cycle when the current cycle completes and a new cycle has not yet been initiated by the cache controller 32, signified by the condition:

CRDY·CADS*

In this instance the cache controller 32 has discontinued pipelining. The state machine transitions from state H6 to state H2 to execute the unLOCKed cycle when the cache controller 32 is still pipelining, i.e., a new cycle has been generated and the previous LOCKed cycle completes, signified by the condition:

CADS·CRDY·CPLOCK*·KLOCK*

The state machine transitions from state H6 to state H3 to execute the unLOCKed cycle when the cache controller 32 indicates that the pipelined cycle following the one that has already been pipelined will be a LOCKed cycle, signified by the condition:

CADS·CRDY·(CPLOCK+KLOCK).

Thus, the HLOCK state machine receives the CPLOCK* and KLOCK* signals from the cache controller 32 and generates a single locking signal, the HLOCK* signal. As previously noted, the C5 cache controller 32 only guarantees that its respective lock outputs will be valid for a time less than the entire LOCKed cycle. The HLOCK state machine samples the KLOCK* and CPLOCK* signals while the CADS* signal is asserted during pipelining. Therefore, when the previous cycle completes as indicated by the CRDY signal, the state machine can immediately advance to the next state, depending on whether either of the CPLOCK* or KLOCK* signals are asserted. In this manner, the EBC 46 can receive the HLOCK* signal during entire LOCKed cycles as it requires.

The PAL 110 generates a state machine referred to as the ALOCK state machine which determines when the arbiter logic 36 can relinquish control of the host bus H between back-to-back LOCKed cycles to a requesting bus master, DMA device, or refresh cycle. The ALOCK state machine detects the initiation of the last LOCKed write in a read-modify-write cycle or a read-read-modify-write-write cycle and also detects the completion of a read-read-modify-write cycle or a read-read cycle and directs the arbiter logic 36 to release the bus to a requesting device. As previously discussed, during back-to-back LOCKed cycles, the KLOCK* output signal from the C5 cache controller 32 may remain asserted if the cache controller 32 is pipelining, thus preventing other devices from gaining control of the bus. This problem is especially critical if back-to-back LOCKed cycles prevent a memory refresh cycle from occurring, thus resulting in memory errors, or if certain low latency devices, such as the floppy disk controller 84, are prevented from performing transfers. The equations for the ALCKSTG0 and ALCKSTG1 signals which form the state machine are as follows:

---

ALCKSTG0 := ALCKSTG0* · ALCKSTG1* · ALOCK* ·
  CWR* · CPLOCK* · KLOCK · CADS · RST* ·
  FSIOUT*
+ ALCKSTG1 · ALOCK · KLOCK · CADS · RST* ·
  FSIOUT*
+ ALCKSTG0 · ALOCK · KLOCK · CADS* · RST* ·
  FSIOUT*
ALCKSTG1 := ALCKSTG1 · ALOCK · KLOCK · CADS*
  RST* · FSIOUT*
+ ALCKSTG1 · ALOCK · CWR* · KLOCK ·
  RST* · FSIOUT*
+ ALCKSTG0 · ALOCK · CWR* · KLOCK · CADS
  · RST* · FSIOUT*
+ ALCKSTG0 · ALCKSTG1 · ALOCK · KLOCK ·
  RST* · FSIOUT*

---

The equation for the ALOCK* signal is as follows:

---

ALOCK := ALCKSTG0* · ALCKSTG1* · ALOCK* · CWR* ·
  CPLOCK* · KLOCK · CADS · RST* · FSIOUT*
+ ALCKSTG0* · ALCKSTG1* · CWR · CPLOCK ·
  KLOCK* · CADS · RST* · FSIOUT*
+ ALCKSTG0* · ALCKSTG1* · ALOCK · CADS* ·
  RST* · FSIOUT*
  + ALOCK · KLOCK · CADS* · RST* · FSIOUT*
  + ALCKSTG0* · ALCKSTG1* · ALOCK ·
  CPLOCK ·
  RST* · FSIOUT*
+ ALCKSTG1 · ALOCK · KLOCK · RST* · FSIOUT*
+ ALCKSTG0 · ALOCK · CWR* · KLOCK · RST* ·
  FSIOUT*

---

Referring now to FIG. 6, the ALOCK state machine is shown. Each of the states in the state machine includes a value which corresponds to the status of the ALOCK* signal, the ALCKSTG0 signal, and the ALCKSTG1 signal, respectively. The CLK2 signal is the clocking signal for the state machine.

The state machine increments or counts upward on LOCKed read cycles and decrements or counts down on LOCKed write cycles. After the CADS* signal is asserted on the last write of a read-modify-write or a read-read-modify-write-write cycle, the ALOCK* signal is deasserted, thus directing the arbiter logic 36 to relinquish the bus to a requesting device. The ALOCK* signal is also deasserted when the KLOCK* signal is deasserted in a read-read-modify-write cycle or a read-read cycle.

The state machine begins in state A0, and all states lead to this state when the RST signal is asserted. Only a single entry is shown for simplicity. The ALOCK* signal is negated high in this state, and thus other devices can gain control of the bus. Similar to the HLOCK state machine, states in the ALOCK state machine illustration having concentric circles assert the ALOCK* signal, and state A0, having only a single circle, negates the ALOCK* signal. The state machine remains in state A0 while the cache controller 32 is not executing any LOCKed cycles, signified by the condition:

RST+CADS*+(CADS·KLOCK*·CPLOCK*)+-(CADS·CPLOCK·CWR*)+(CADS·KLOCK·CWR)

Therefore, if the cache controller 32 has not yet begun a cycle or if the cache controller 32 has begun a cycle that is not LOCKed, the state machine remains in state A0. The state machine also remains in state A0, if the cache controller 32 begins a read cycle and the CPLOCK* signal is asserted. It is noted that under normal conditions this combination should never occur since the C5 cache controller does not assert the CPLOCK* signal for read cycles. Also, the state machine remains in state A0 if the cache controller 32 begins a write cycle and the KLOCK* signal is asserted. Again, under normal circumstances this condition also should not occur because the KLOCK* signal is asserted at the beginning of a read-modify-write cycle and is negated high when the CADS* signal of the last LOCKed operation, i.e., the last write operation occurs.

The state machine transitions from state A0 to state A5 when the cache controller 32 begins the read cycle of a read-modify-write cycle and the KLOCK* signal is asserted. This transition is signified by the condition:

30 RST*·CADS·KLOCK·CWR*

The state machine remains in state A5 while the current cycle is completing and no new cycles are pending, signified by the condition:

RST*·CADS*·KLOCK

In state A5, the ALOCK* signal is asserted low and thus the arbiter logic 36 functions so that the C5 cache controller 32 retains control of the host bus H during this time. The state machine returns from state A5 to state A0 if the cache controller 32 then begins a write cycle, which is the write portion of a read-modify-write cycle, signified by the condition:

(CADS·KLOCK·CWR)+KLOCK*+RST

In state A0, the ALOCK* signal is negated high, thus indicating to the arbiter logic 36 that control of the host bus H can be relinquished to a requesting device. It is specifically noted that this indication occurs as soon as the final or matching write is recognized, allowing sufficient time for the arbitration logic 36 to function so that control can be transferred quickly and smoothly.

The state machine advances from state A5 to state A6 when the second read of a read-read-modify-write-write cycle occurs, signified by the condition:

RST*·CADS·KLOCK·CWR*

In state A6 the cache controller 32 is executing the second of the two LOCKed reads. The ALOCK* signal is asserted in this state, and thus the arbiter logic 36 functions so that the C5 cache controller 32 retains control of the host bus H. The state machine returns from state A6 to state A0 if the KLOCK* signal is negated. The state machine returns from state A6 to state A5 when the cache controller 32 executes the first write cycle of the read-read-modify-write-write cycle, signified by the condition:

RST*·CADS·KLOCK·CWR

The state machine will then advance from state A5 to state A0 on the next write cycle of the read-read-modify-write-write cycle when the second write is begun, signified by the CADS* signal, the KLOCK* signal and the CWR signals all being asserted, as discussed in the state A5 to state A0 transition. This signifies the end of the LOCKed cycle and the ALOCK* signal will be negated, thus indicating to the arbiter logic 36 that it can relinquish the bus at this time to a requesting device. In this manner, the ALOCK* signal is asserted at the beginning of the last write of a read-modify-write or read-read-modify-write-write cycle with a sufficient amount of advance warning to allow the arbiter logic 36 to relinquish the bus. This method avoids the problems associated with detecting a LOCKed write cycle followed by a LOCKed read cycle wherein it has been determined that this method does not leave sufficient time to allow arbitration.

The state machine also advances from state A5 to state A0 if the KLOCK* signal is deasserted. In this instance, a read-read-modify-write cycle has occurred. It is noted that the state machine does not detect the beginning of the last write of the read-read-modify-write cycle, but rather detects the deassertion of the KLOCK* signal. In this instance, an overlocked condition may occur, but these are infrequent cycles.

The state machine advances from state A6 to state A0 if the KLOCK* signal is negated. In this instance, the state machine has detected a locked read-read cycle. It is noted here that the state machine does not detect the beginning of the last read cycle in a locked read-read cycle, but rather detects the deassertion of the KLOCK* signal. As noted above, in this instance, an overlocked condition may occur.

The state machine advances from state A6 to state A7 if a third LOCKed write cycle of a possible read-read-read-modify-write-write-write (RRRMWWW) cycle occurs. It is noted that this transition should never occur as the above RRRMWWW cycle should never occur in the preferred embodiment. The state machine remains in state A7 while the KLOCK* signal is asserted and returns to state A0 when the KLOCK* signal is negated high.

The state machine advances from state A0 to state A4 if the cache controller 32 begins a write cycle with the CPLOCK* signal asserted. In this instance, the cache controller 32 is performing a series of write cycles which require protection. In state A4, the ALOCK* signal is asserted low, and thus the arbiter logic 36 functions so that the C5 cache controller 32 retains control of the host bus H. The arbiter logic 36 will have already granted control to the cache controller 32 when the state A0 to state A4 transition is made, so is satisfied for the first cycle. The state machine remains in state A4 while the CPLOCK* signal is asserted and while the current cycle is in progress. The state machine returns from state A4 to state A0 when the CPLOCK* signal is negated on the next cycle, signified by the condition:

(CADS·CPLOCK*)+RST

The arbiter logic 36 samples the ALOCK* signal along with the CADS* signal to determine ownership of the next cycle. As the ALOCK state machine does not negate the ALOCK* signal until after the state machine and the arbiter logic 36 have sampled and found both the ALOCK* signal and the CADS* signal asserted, the arbiter logic 36 will not allow ownership to change, even though the ALOCK* signal is negated shortly after the sampling.

Therefore, the ALOCK state machine provides the ALOCK* signal to the arbiter logic 36 to indicate when the arbiter logic 36 can relinquish control of the bus to a requesting bus master or device. The state machine increments on reads and decrements on write cycles during read-modify-write cycles to determine when the last matching write of the cycle is commenced. When this occurs, the ALOCK* signal is negated high, and the arbiter logic 36 can relinquish control of the bus to other devices. The ALOCK* signal is also asserted after the completion of a read-read-modify-write cycle or a read-read cycle. The state machine also monitors the CPLOCK* signal to determine when the arbiter logic 36 can relinquish the bus during consecutive write cycles which require protection, such as 64 bit writes or cache line fills.

This description of the preferred embodiment of the computer system C is exemplary only and other variations in the computer system design could of course be developed.

We claim:

1. A computer system comprising:
   a system bus;
   a first device coupled to said system bus for requesting and gaining control of said system bus;
   a second device coupled to said system bus for controlling operational cycles on said bus, said first device asserting a locking signal to said system bus during read-modify-write operational cycles to maintain exclusive control of said system bus, wherein said locking signal remains continuously asserted during back-to-back locked operational cycles;
   means coupled to said system bus for incrementing an indicator on an initiation of locked read cycles;
   means coupled to said system bus and said incrementing means for decrementing said indicator on an initiation of matching locked write cycles; and
   means coupled to said decrementing means and said system bus for determining when the last matching locked write cycle has initiated and for indicating that the first device can relinquish control of said system bus based on the initiation of said last matching locked write cycle.

2. The system of claim 1, wherein said first device generates an address strobe signal to initiate cycles, wherein said incrementing means and decrementing means receive said address strobe signal and said locking signal and increment and decrement, respectively, when said first device generates said address strobe signal and said locking signal is asserted to said system bus.

3. The system of claim 1, wherein said locked read-modify-write cycles may comprise either read-modify-write cycles or read-read-modify-write-write cycles.

4. The system of claim 1, wherein said first device further generates multiple cycle write transfers which require locking protection, said first device asserting a second locking signal to said system bus when said multiple cycle write transfers occur, the system further comprising:
   means coupled to said system bus receiving said second locked signal for indicating that said first device can relinquish control of said system bus when said second locking signal is deasserted.

5. A computer system, comprising:
   a system bus;
   a first device coupled to said system bus, performing a plurality of sequential cycles and providing a first signal to said system bus during a cycle referred to as a current cycle, wherein said first signal is in a pipelined condition or is not in a pipelined condition;
   a second device coupled to said system bus which requires a non-pipelined version of said first signal;
   means coupled to said system bus for receiving said first signal at the beginning of the current cycle and generating a signal to said second device having a same state as said first signal;
   means coupled to said system bus and said generating means for maintaining said generated signal in its current state if said first device initiates another cycle before the current cycle completes and said first signal changes state in said initiated another cycle; and
   means coupled to said system bus, said generating means, and said maintaining means for changing the state of said generated signal to that of said first signal of said initiated cycle when the current cycle completes.

6. The computer system of claim 5, wherein said first device generates an address strobe signal to initiate a cycle and receives a ready signal to terminate a cycle;
   wherein said maintaining means and said changing means receive said address strobe signal and said ready signal;
   wherein said maintaining means operates when said address strobe signal is provided for a new cycle before said ready signal is provided terminating the current cycle; and
   wherein said changing means operates when said ready signal is received.

7. The computer system of claim 5, wherein said first signal is a locking signal for preventing intervention.

8. A computer system, comprising:
   a system bus;
   a first device coupled to said system bus providing a signal indicative of a property of a multiple cycle operation, each cycle including a cycle start identifier, said property signal being provided from the first cycle start identifier through intervening cycles and being removed with the cycle start identifier of the final cycle of said multiple cycle operation;

a second device coupled to said system bus for receiving a signal indicative of said property, wherein said received signal must be present essentially throughout the multiple cycle operation; and means coupled to said first device and said second device for receiving said property signal from said first device and providing a signal representative of said property signal state to said second device substantially throughout said multiple cycle operation, including after said final cycle start identifier of said final cycle.

9. The system of claim 8, wherein said property signal is a locked cycle identifier and said cycle start identifier is a property signal valid indicator.

* * * * *